United States Patent
Matin et al.

(10) Patent No.: US 10,278,232 B2
(45) Date of Patent: Apr. 30, 2019

(54) APPARATUS AND METHOD FOR HANDLING OUT-OF-SYNC AND RADIO LINK FAILURE WITH FRACTIONAL DPCH CALLS

(71) Applicant: QUALCOMM Incorporated, San Diego, CA (US)

(72) Inventors: Sharif Ahsanul Matin, San Diego, CA (US); Wei Zhang, Santa Clara, CA (US); Marian Madan, Bad Soden am Taunus (DE); Krishna Chaitanya Mukkera, San Diego, CA (US); Praveen Peruru, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 14/223,907

(22) Filed: Mar. 24, 2014

(65) Prior Publication Data
US 2015/0085762 A1  Mar. 26, 2015

Related U.S. Application Data

(60) Provisional application No. 61/880,707, filed on Sep. 20, 2013.

(51) Int. Cl.
*H04W 76/30* (2018.01)
*H04W 76/19* (2018.01)
(Continued)

(52) U.S. Cl.
CPC .......... *H04W 76/30* (2018.02); *H04W 24/02* (2013.01); *H04W 76/19* (2018.02); *H04W 76/34* (2018.02)

(58) Field of Classification Search
None
See application file for complete search history.

(56) References Cited

U.S. PATENT DOCUMENTS 6,564,060 B1 * 5/2003 Hoagland ........... H04W 76/064
455/450
7,864,724 B2  1/2011 Kaikkonen et al.
(Continued)

FOREIGN PATENT DOCUMENTS

| CN | 101438613 A | 5/2009 |
| JP | 2011055363 A | 3/2011 |
| KR | 20070092441 A | 9/2007 |

OTHER PUBLICATIONS

ETSI TS 125 214 V11.3.0. Universal Mobile Telecommunications System (UMTS); Physical layer procedures (FDD) (3GPP TS 25.214 version 11.3.0 Release 11) (Sep. 2012).*
(Continued)

*Primary Examiner* — Jeffrey M Rutkowski
*Assistant Examiner* — Andre Tacdiran
(74) *Attorney, Agent, or Firm* — Loza & Loza, LLP

(57) ABSTRACT

Aspects of the present disclosure provide an apparatus and methods for operating the same that can improve out-of-sync and radio link failure handling in a W-CDMA network. A user equipment (UE) establishes a packet switched (PS) connection between the UE and a base station, wherein the PS connection includes a Fractional Dedicated Physical Channel (F-DPCH). The UE configures an in-sync threshold ($Q_{in}$) and an out-of-sync threshold ($Q_{out}$) for the F-DPCH, wherein values of the $Q_{in}$ and $Q_{out}$ are set higher than those of corresponding $Q_{in}$ and $Q_{out}$ of a Dedicated Physical Channel (DPCH). The UE further estimates a downlink (DL) Signal to Interference Ratio (SIR) based on one or more transmit power control (TPC) commands of the F-DPCH, and determines whether to release the PS connection based on a comparison of the estimated SIR and $Q_{out}$ of the F-DPCH.

18 Claims, 12 Drawing Sheets

(51) Int. Cl.
*H04W 24/02* (2009.01)
*H04W 76/34* (2018.01)

(56) References Cited

U.S. PATENT DOCUMENTS

| | | | |
|---|---|---|---|
| 8,538,472 B2 | 9/2013 | Dawid et al. | |
| 2005/0054309 A1* | 3/2005 | Masuda | H04W 56/008 455/134 |
| 2007/0286155 A1* | 12/2007 | Kaikkonen | H04W 52/221 370/350 |
| 2008/0049710 A1* | 2/2008 | Zeira | H04W 52/08 370/345 |
| 2010/0041389 A1* | 2/2010 | Cave | H04W 76/028 455/423 |
| 2010/0113008 A1* | 5/2010 | Wang | H04L 1/20 455/423 |
| 2010/0124203 A1* | 5/2010 | Tenny | H04W 36/24 370/331 |
| 2011/0051696 A1* | 3/2011 | Shinoda | H04W 72/085 370/336 |
| 2011/0124340 A1* | 5/2011 | Puttonen | H04W 36/0083 455/437 |
| 2012/0076189 A1* | 3/2012 | Luschi | H04W 52/225 375/224 |
| 2012/0147755 A1* | 6/2012 | Chen | H04L 5/001 370/242 |
| 2012/0149424 A1* | 6/2012 | Dawid | H04B 7/0877 455/522 |
| 2013/0021992 A1* | 1/2013 | Marco | H04W 56/00 370/329 |
| 2013/0324180 A1 | 12/2013 | Zhang et al. | |
| 2014/0024371 A1* | 1/2014 | Lair | H04W 48/08 455/435.1 |
| 2014/0211694 A1* | 7/2014 | He | H04W 52/241 370/328 |
| 2015/0092554 A1* | 4/2015 | Mochizuki | H04W 76/046 370/235 |
| 2015/0382330 A1* | 12/2015 | Wu | H04W 52/04 370/335 |
| 2016/0029234 A1* | 1/2016 | Zhang | H04W 76/00 370/252 |

OTHER PUBLICATIONS

ETSI TS 125 101 V7.8.0. Universal Mobile Telecommunications System (UMTS); User Equipment (UE) radio transmission and reception (FDD) (3GPP TS 25.101 version 7.8.0 Release 7) (Jun. 2007).*
International Search Report and Written Opinion—PCT/US2014/056307—ISA/EPO—dated Apr. 1, 2015.
3GPP, ETSI TS 125 214 V11.6.0 (Jul. 2013) Universal Mobile Telecommunications System (UMTS); Physical layer procedures (FDD), 3GPP TS 25.214 version 11.6.0 Release 11, 129 pages.
3GPP TS 25.101 V11.6.0: "3rd Generation Partnership Project; Technical Spefication Group Radio Access Network; Physical Layer procedures (FDD)", Release 11, Jul. 7, 2013, pp. 36-39.
Qualcomm Incorporated: "Remaining CLTD Design Aspects", 3GPP TSG-RAN WG1#67 R1-114001, Internet http://www. 3gpp.org/ftp/tsg_ran/WG1_RL1/TSGR1_67/Docs/R1-114001.zip, Nov. 8, 2011, pp. 1-4.

* cited by examiner

*Wireless Communication System*

Access Network

Protocol Stack

APPARATUS AND METHOD FOR HANDLING OUT-OF-SYNC AND RADIO LINK FAILURE WITH FRACTIONAL DPCH CALLS

CROSS-REFERENCE TO RELATED APPLICATIONS

This application claims priority to and the benefit of provisional patent application No. 61/880,707 filed in the United States Patent Office on Sep. 20, 2013, the entire content of which is incorporated herein by reference.

TECHNICAL FIELD

Aspects of the present disclosure relate generally to wireless communication systems, and more particularly, to an apparatus and method for handling out-of-sync and radio link failure in W-CDMA networks.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

In earlier generations of W-CDMA network, such as those described in the 3GPP technical specification 25.221, which was released in 1999 and commonly known as Release 99 or R99, each user (e.g., mobile terminal) has a separate and independent communication path to the network base station (known as Node B in UMTS) via a Dedicated Physical Channel (DPCH). As the W-CDMA technology evolved, new physical channels were added to improve system operation and to accommodate ever increasing number of users. For example, in HSPA networks, the Fractional Dedicated Physical Channel (F-DPCH) was added to reduce the consumption of downlink channelization codes among multiples users. Newer generation of user equipment (UE) typically supports communications on both R99 DPCH and F-DPCH. However, due to many differences between communication protocols on these channels, certain optimizations of various channel parameters at the UE are desirable.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide an apparatus and methods for operating the same that can improve out-of-sync and radio link failure handling in a W-CDMA network supporting both R99 DPCH and F-DPCH.

One aspect of the disclosure provides a method for wireless communication operable at a user equipment (UE). The UE establishes a packet switched (PS) connection between the UE and a base station, wherein the PS connection includes a Fractional Dedicated Physical Channel (F-DPCH). The UE configures an in-sync threshold ($Q_{in}$) and an out-of-sync threshold ($Q_{out}$) for the F-DPCH, wherein values of the $Q_{in}$ and $Q_{out}$ are set higher than those of corresponding $Q_{in}$ and $Q_{out}$ of a Dedicated Physical Channel (DPCH). The UE further estimates a downlink (DL) Signal to Interference Ratio (SIR) based on one or more transmit power control (TPC) commands of the F-DPCH, and determines whether to release the PS connection based on a comparison of the estimated SIR and $Q_{out}$ of the F-DPCH.

Another aspect of the disclosure provides an apparatus for wireless communication. The apparatus includes means for establishing a packet switched (PS) connection between the apparatus and a base station, wherein the PS connection includes a Fractional Dedicated Physical Channel (F-DPCH). The apparatus includes means for configuring an in-sync threshold ($Q_{in}$) and an out-of-sync threshold ($Q_{out}$) for the F-DPCH, wherein values of the $Q_{in}$ and $Q_{out}$ are set higher than those of corresponding $Q_{in}$ and $Q_{out}$ of a Dedicated Physical Channel (DPCH). The apparatus further includes means for estimating a downlink (DL) Signal-to-Interference Ratio (SIR) based on one or more transmit power control (TPC) commands of the F-DPCH and means for determining whether to release the PS connection based on a comparison of the estimated SIR and $Q_{out}$ of the F-DPCH.

Another aspect of the disclosure provides a computer-readable storage medium. The computer-readable storage medium includes code for causing a user equipment (UE) to perform various functions. The UE establishes a packet switched (PS) connection between the UE and a base station, wherein the PS connection includes a Fractional Dedicated Physical Channel (F-DPCH). The UE configures an in-sync threshold ($Q_{in}$) and an out-of-sync threshold ($Q_{out}$) for the F-DPCH, wherein values of the $Q_{in}$ and $Q_{out}$ are set higher than those of corresponding $Q_{in}$ and $Q_{out}$ of a Dedicated Physical Channel (DPCH). The UE further estimates a downlink (DL) Signal-to-Interference Ratio (SIR) based on one or more transmit power control (TPC) commands of the F-DPCH, and determine whether to release the PS connection based on a comparison of the estimated SIR and $Q_{out}$ of the F-DPCH.

Another aspect of the disclosure provides an apparatus for wireless communication. The apparatus includes at least one processor, a communication interface coupled to the at least one processor, and a memory coupled to the at least one processor. The at least one processor includes a number of components including first through fourth components. The first component is configured to establish a packet switched (PS) connection between the apparatus and a base station, wherein the PS connection includes a Fractional Dedicated Physical Channel (F-DPCH). The second component is configured to configure an in-sync threshold ($Q_{in}$) and an out-of-sync threshold ($Q_{out}$) for the F-DPCH, wherein values of the $Q_{in}$ and $Q_{out}$ are set higher than those of corresponding $Q_{in}$. and $Q_{out}$ of a Dedicated Physical Channel (DPCH). The third component is configured to estimate a downlink (DL) Signal-to-Interference Ratio (SIR) based on one or more transmit power control (TPC) commands of the F-DPCH. The fourth component is configured to determine whether to release the PS connection based on a comparison of the estimated SIR and $Q_{out}$ of the F-DPCH.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Aspects of the present disclosure provide an apparatus and methods for operating the same that can improve out-of-sync and radio link failure handling in a W-CDMA network supporting both R99 DPCH and F-DPCH. The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
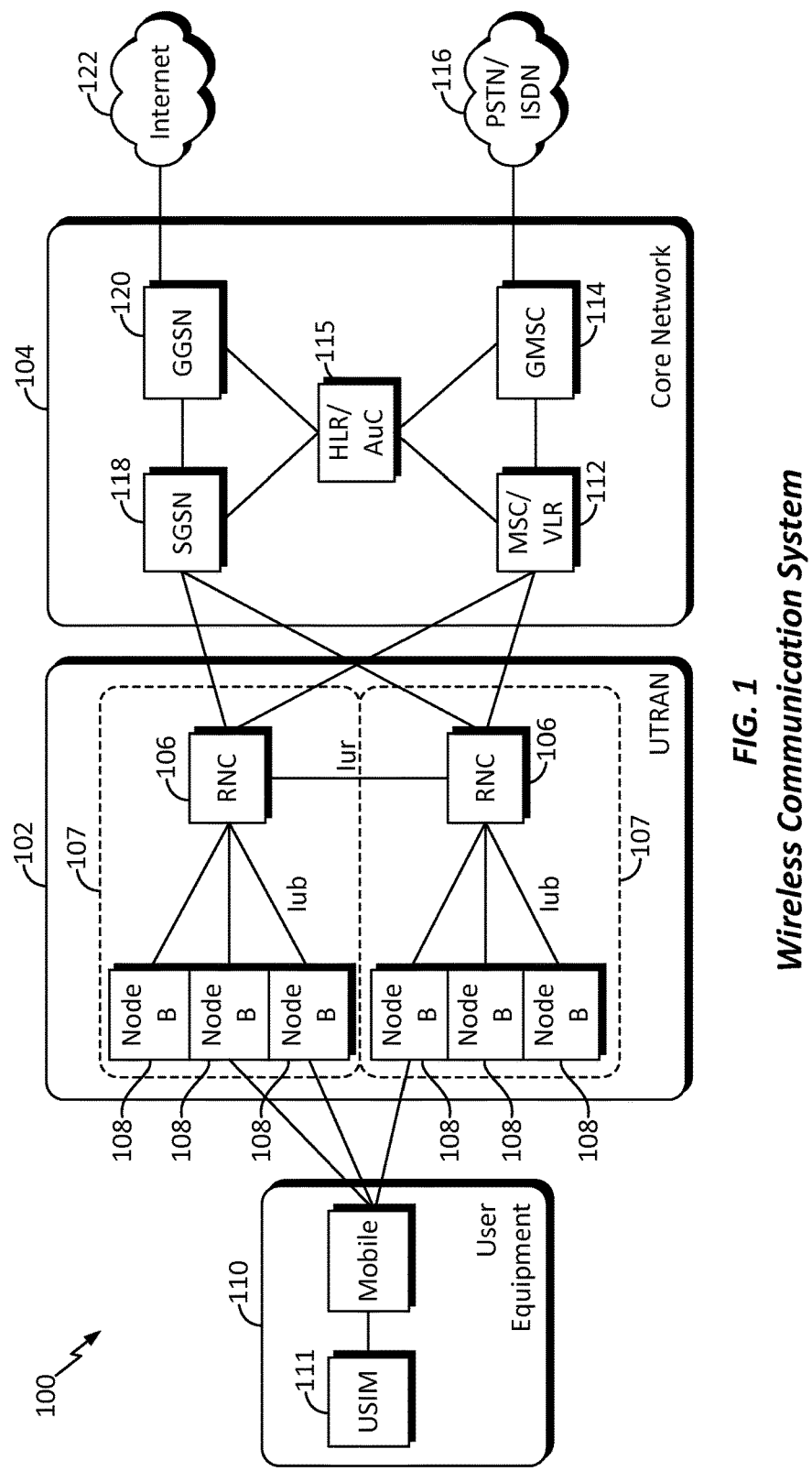
FIG. 1 is a block diagram conceptually illustrating an example of a telecommunications system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a Universal Mobile Telecommunications System (UMTS) system 100. A UMTS network includes three interacting domains: a core network 104, a radio access network (RAN) (e.g., the UMTS Terrestrial Radio Access Network (UTRAN) 102), and a user equipment (UE) 110. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include a universal subscriber identity module (USIM) 111, which contains a user's subscription information to a network. For illustrative purposes, one UE 110 is shown in communication with a number of the Node Bs 108. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

Figure 2:
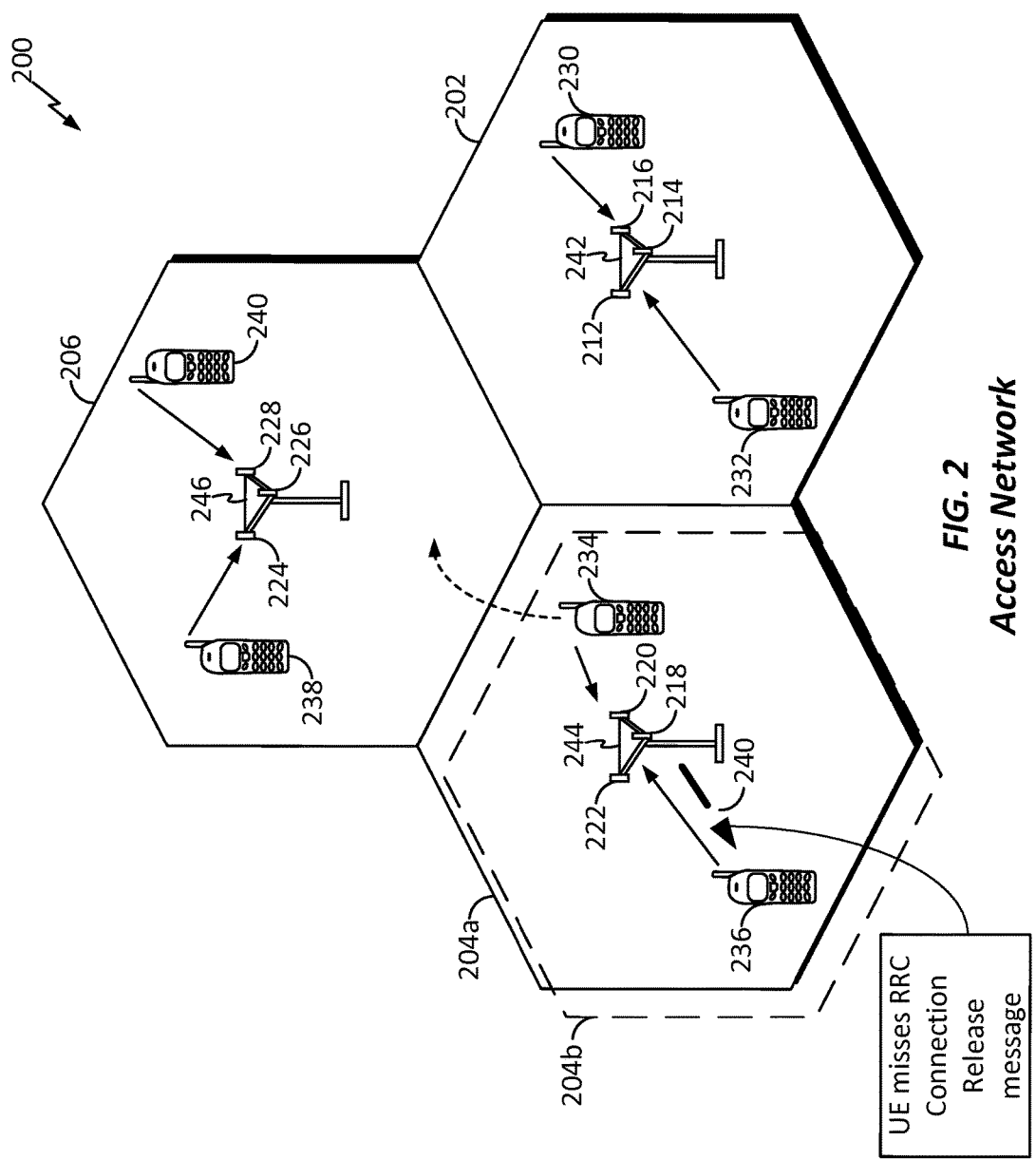
FIG. 2 is a conceptual diagram illustrating an example of an access network in accordance with an aspect of the disclosure.

The UTRAN 102 is one example of a RAN that may be utilized in accordance with the present disclosure. Referring to FIG. 2, by way of example and without limitation, a simplified schematic illustration of a RAN 200 in a UTRAN architecture is illustrated. The system includes multiple cellular regions (cells), including cells 202, 204, and 206, each of which may include one or more sectors. Cells may be defined geographically (e.g., by coverage area) and/or may be defined in accordance with a frequency, scrambling code, etc. That is, the illustrated geographically-defined cells 202, 204, and 206 may each be further divided into a plurality of cells, e.g., by utilizing different scrambling codes. For example, cell 204a may utilize a first scrambling code, and cell 204b, while in the same geographic region and served by the same Node B 244, may be distinguished by utilizing a second scrambling code.

In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with Node B 242, UEs 234 and 236 may be in communication with Node B 244, and UEs 238 and 240 may be in communication with Node B 246. Here, each Node B 242, 244, and 246 may be configured to provide an access point to a core network 204 (see FIG. 2) for all the UEs 230, 232, 234, 236, 238, and 240 in the respective cells 202, 204, and 206.

Figure 3:
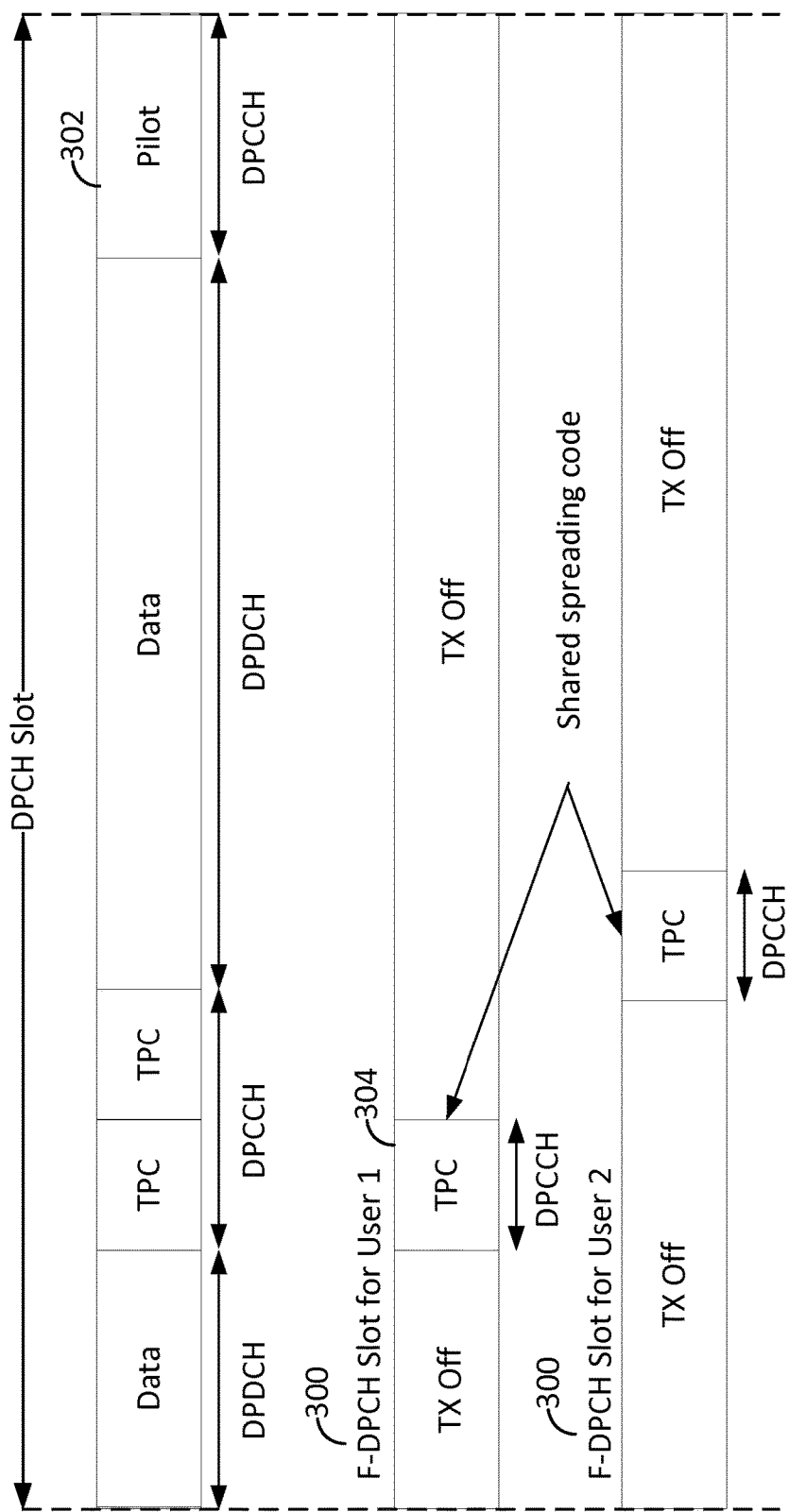
FIG. 3 is a conceptual diagram illustrating a DPCH and Fractional DPCHs in a DPCH slot.

During a call with a source cell, or at any other time, the UE 236 may monitor various parameters of the source cell as well as various parameters of neighboring cells. Further, depending on the quality of these parameters, the UE 236 may maintain communication with one or more of the neighboring cells. During this time, the UE 236 may maintain an Active Set, that is, a list of cells to which the UE 236 is simultaneously connected (i.e., the UTRAN cells that are currently assigning a downlink dedicated physical channel (DPCH) or fractional downlink dedicated physical channel (F-DPCH) to the UE 236 may constitute the Active Set). FIG. 3 is a conceptual diagram illustrating multiple F-DPCHs assigned to different UEs in the same DPCH slot. The use of F-DPCHs 300, when using different timing offsets, allows the transmit power control (TPC) command stream for different users to be time multiplexed on the same channelization code.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 102 is based on such DS-CDMA technology and additionally calls for a frequency division duplexing (FDD). FDD uses a different carrier frequency for the uplink (UL) and downlink (DL) between a Node B 108 and a UE 110.

Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

A high speed packet access (HSPA) air interface includes a series of enhancements to the 3G/W-CDMA air interface between the UE 110 and the UTRAN 102, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

One difference on the downlink between Release-5 HSDPA and the previously standardized circuit-switched air-interface is the absence of soft handover in HSDPA. This means that HSDPA channels are transmitted to the UE from a single cell called the HSDPA serving cell. As the user moves, or as one cell becomes preferable to another, the HSDPA serving cell may change. Still, the UE may be in soft handover on the associated DPCH, receiving the same information from plural cells.

In Release 5 HSDPA, at any instance a UE has one serving cell: the strongest cell in the active set as according to the UE measurements of $E_c/I_0$. According to mobility procedures defined in Release 5 of 3GPP Technical Specification (TS) 25.331, the radio resource control (RRC) signaling messages for changing the HSPDA serving cell are transmitted from the current HSDPA serving cell (i.e., the source cell) and not the cell that the UE reports as being the stronger cell (i.e., the target cell).

3GPP Release 6 specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions. In the present disclosure, the DPCCH may be referred to as a control channel (e.g., a primary control channel) or a pilot channel (e.g., a primary pilot channel) in accordance with whether reference is being made to the channel's control aspects or its pilot aspects.

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH).

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 110 and the core network 104 (referring to FIG. 1), and may include circuit switched and packet switched protocols. The AS provides the lower layers, for signaling between the UTRAN 102 and the UE 110, and may include a user plane and a control plane. Here, the user plane or data plane carries user traffic, while the control plane carries control information (i.e., signaling).

Figure 4:
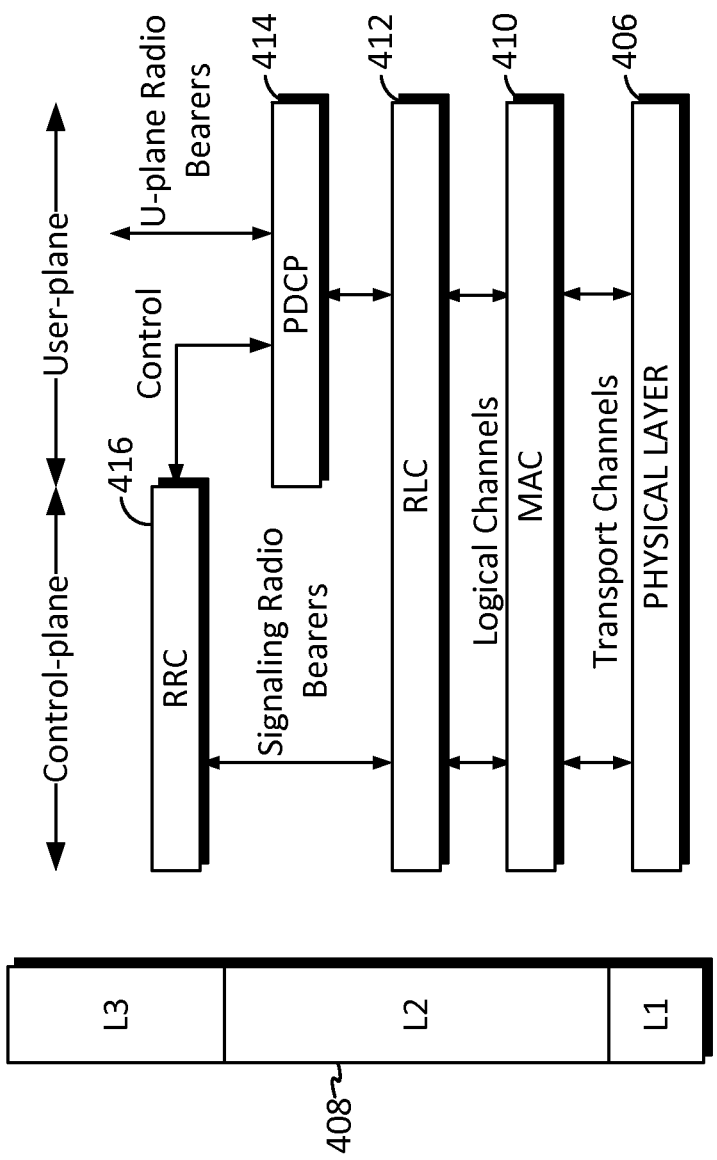
FIG. 4 is a conceptual diagram illustrating an example of a radio protocol architecture for the user and control plane.

Turning to FIG. 4, the AS is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 408, is above the physical layer 406 and is responsible for the link between the UE 210 and Node B 208 over the physical layer 406.

At Layer 3, the RRC layer 416 handles the control plane signaling between the UE 210 and the Node B 208. RRC layer 416 includes a number of functional entities for routing higher layer messages, handling broadcasting and paging functions, establishing and configuring radio bearers, etc.

In the illustrated air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs)

including RLC Data PDUs, RLC Status PDUs, and RLC Reset PDUs, among others. In the present disclosure, the term "packet" may refer to any RLC PDU exchanged between RLC peer entities.

The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations. The MAC sublayer 410 includes various MAC entities, including but not limited to a MAC-d entity and MAC-hs/ehs entity. The Radio Network Controller (RNC) houses protocol layers from MAC-d and above. For the high speed channels, the MAC-hs/ehs layer is housed in the Node B.

As part of regular call processing, a Node B can release a W-CDMA packet switched (PS) call or connection by sending an RRC Connection Release message (e.g., message 240 of FIG. 2) to a UE. In one aspect of the disclosure, the UE and Node B may be the UE 110 and Node B 108 of FIG. 1, respectively. Occasionally, the UE may miss the RRC Connection Release message because of HARQ level retransmission sub-block error rate (SBLER) or due to other network issues. Within a few seconds after the RRC Connection Release message was sent, the network may withdraw all dedicated resources assigned to the UE as part of call clearance of Channel Element (e.g., capacity resources for supporting radio access bearer (RAB) connections). As a result, associated DPCH or EUL resources will no longer be available for the UE. From this point onward, the UE relies on the F-DPCH to determine signal quality such as Signal-to-Interference Ratio Estimate (SIRE) measurements, which are used to determine out-of-sync (OOS) state and radio link (RL) failure state of the UE, to release its own call resources.

With respect to power control commands from the Node-B, a UE is considered out-of-sync (not synchronized) if the DL DPCCH quality or the quality of the TPC fields of the F-DPCH frame received from the serving HS-DSCH cell is worse than an OOS threshold $Q_{out}$ for a predetermined period (e.g., 160 ms as defined in 3GPP TS 25.101). A UE is considered in-sync (synchronized) if the quality of the DL DPCCH or the TPC fields of the F-DPCH frame received from the serving HS-DSCH cell over the predetermined period is better than an in-sync threshold $Q_{in}$ (see 3GPP TS 25.101 for more detail).

In general, radio link failure at UE side occurs when it experiences interference and/or poor signal strength leading to disconnection with a Node B. For example, it may be referred to as call drops (e.g., for voice calls), and the radio channel strength is too weak to continue with the applications. In aspects of the disclosure, a UE declares a radio link failure when signal quality from the Node B is below a certain threshold (OOS threshold) for a predetermined number of consecutive occasions or indications. For example, in a UMTS system, radio link failure occurs if after some number N313 of out-of-syncs (e.g., consecutive OOS) have been indicated (N313 being the label of a parameter whose value is the number), less than some number N315 of successive in-syncs are indicated before some number T313 of time periods expire (where the counting toward the number T313 starts from when the N313 consecutive out-of-syncs are indicated). When the timer for T313 expires. A radio link failure occurs.

For F-DPCH, the TPC SIR threshold ($Q_{out}$) for out-of-sync state as well as TPC SIR threshold ($Q_{in}$) for in-sync state may be set to the same low values as for the R99 DPCH on some UEs. For example, $Q_{in}$ and $Q_{out}$ may be set to −3 dB and −6.50 dB respectively, for both R99 DPCH and F-DPCH. However, the SIRE determined at the UE often cannot reach such low $Q_{out}$ value (e.g., −6.50 dB), even though all dedicated resources have been removed by the network. As a result, the UE may stay in a "dangling" call state for an undesirably long time, e.g., more than a minute, which may cause significant packet switched (PS) activation delay for the next call.

Furthermore, F-DPCH SIR estimation has several limitations. One limitation is that, in F-DPCH, the UE relies on DL TPC symbols for SIR measurement. These TPC symbols are either up or down, in stochastic or random manner. Thus, the UE uses filtered absolute values of raw DL TPC symbols for F-DPCH SIR estimation (SIRE). This is different from R99 DPCH based SIR estimation, where the UE measures the SIR based on dedicated pilot symbols, which have a pattern that is already known to the UE based on the slot format provided at the beginning of the call. Thus, in R99 DPCH, the SIR is estimated based on filtered de-patterned dedicated pilots. Furthermore, F-DPCH is generally noisy due to quantization effects and inclusion of other noise. According to a generally known mathematical derivation, the F-DPCH SIRE is close to the maximum likelihood (ML) estimate when operating under good signal-to-noise ratio (SNR) conditions. However, in poor radio frequency (RF) conditions, the estimate may no longer be sufficiently accurate. This can be illustrated in the following example. Let y be the received filtered amplitude of TPC symbols of an F-DPCH, s and η be the true amplitude of the TPC symbol and the noise effects, respectively, and $\sigma^2$ be the noise variance.

$$|y|=|s+\eta|$$

$$E\{|y|^2\}=E\{|s|^2\}+\sigma^2$$

Here, the expected value of the received TPC symbols is different from the expected value of the true TPC symbols by the noise variance. Therefore, it is desirable to correct excess power (bias) experienced in F-DPCH calls due to inaccurate TPC SIRE. There is also another F-DPCH related limitation. In HSPA, the UE may declare OOS based on failures of a cyclic redundancy check (CRC). However, for F-DPCH calls, all the signaling traffic appears in HS-PDSCH, and a UE cannot have CRC-based provision to declare OOS in call maintenance. Therefore, the value of $Q_{out}$ for F-DPCH calls need to account for this limitation.

In accordance with various aspects of the present disclosure, a UE implements one or more graceful call release schemes to handle DPCH and F-DPCH calls, which will be described fully below. In one aspect of the disclosure, a UE may configure $Q_{in}$ and $Q_{out}$ values of F-DPCH to be several dB higher than the corresponding threshold values of the R99 DPCH. Suitable values of $Q_{in}$ and $Q_{out}$ may be determined based on simulation or actual network measurements. The difference in the $Q_{in}$ and $Q_{out}$ values for the F-DPCH and the R99 DPCH serves to compensate for the quantization and other noise biases caused by limitations of the SIR estimation mechanism in F-DPCH. This mechanism allows the UE to gracefully release calls that have already been terminated by the network.

In another aspect of the disclosure, a UE may use another wrap up event (e.g., a safety clause) to release calls. For example, the UE may automatically or autonomously declare radio link failure and release call resources if the following two conditions are satisfied: (1) if the absolute DL SIRE is less than x dB (or, the SIRE lags the SIR target (SIRT) by a certain amount (e.g., y dB) or greater) for t amount of time, and (2) if UL TPC commands are such that a wind-up situation (i.e., UE sends all up TPC commands to the Node B) persists for the entire time duration t. In one aspect of the disclosure, the UE may automatically or autonomously declare radio link failure and release call resources when the absolute DL SIRE is less than about 6 dB (or the SIRE lags the SIRT by about 6 dB or more) for about 10 seconds.

In implementing the above F-DPCH call handling solutions, several considerations are taken into account. If the UE wishes to compensate for the F-DPCH SIR estimation error, there may be side effects. First, there may be undesirable impact on the outage based F-DPCH outer loop power control. Second, if $Q_{out}$ is increased too much, call drop rates might increase. Therefore, in some aspects of the disclosure, the UE utilizes a wrap up event as a compromise between noise compensation of SIR estimation error to avoid a "dangling" call state and PDSCH power benefit which sometimes a UE can enjoy and to reduce excessive radio link failure declarations.

In yet another aspect of the disclosure, the UE may localize the condition (2) in the call release mechanism above by gating (e.g., AND-ing) a DL TPC rejection condition (3). In one aspect of the disclosure, condition (2) can occur if z % (e.g., about 90%) of DL TPC commands are rejected. This condition (3) may be used to account for the power control convergence speed difference in F-DPCH, UL Tx Power impact, etc. Therefore, with condition (3), an F-DPCH $Q_{out}$ value higher than that of DPCH may be selected while undesirable frequent call drops may be avoided due to increased $Q_{out}$ value for the F-DPCH.

In yet another aspect of the disclosure, a UE may declare a radio link failure if the number of DL TPC rejections is larger than z % (e.g., about 90%) and the SIRE lags (less than) SIRT by a certain threshold (which may be determined based on simulation or actual network measurements), or, the SIRE falls below an absolute value of x dB (e.g., about 6 dB) for t amount of time (e.g., about 10 seconds), as described above. In one aspect of the disclosure, the t value may be larger than values T314 and T315, which are defined in 3GPP TS 25.331, sections 8.3.1.13 and 8.3.1.13, associated with radio link failure.

Various combinations of the above described call release mechanisms may be used by the UEs depending on the specific system and network requirements.

Figure 5:
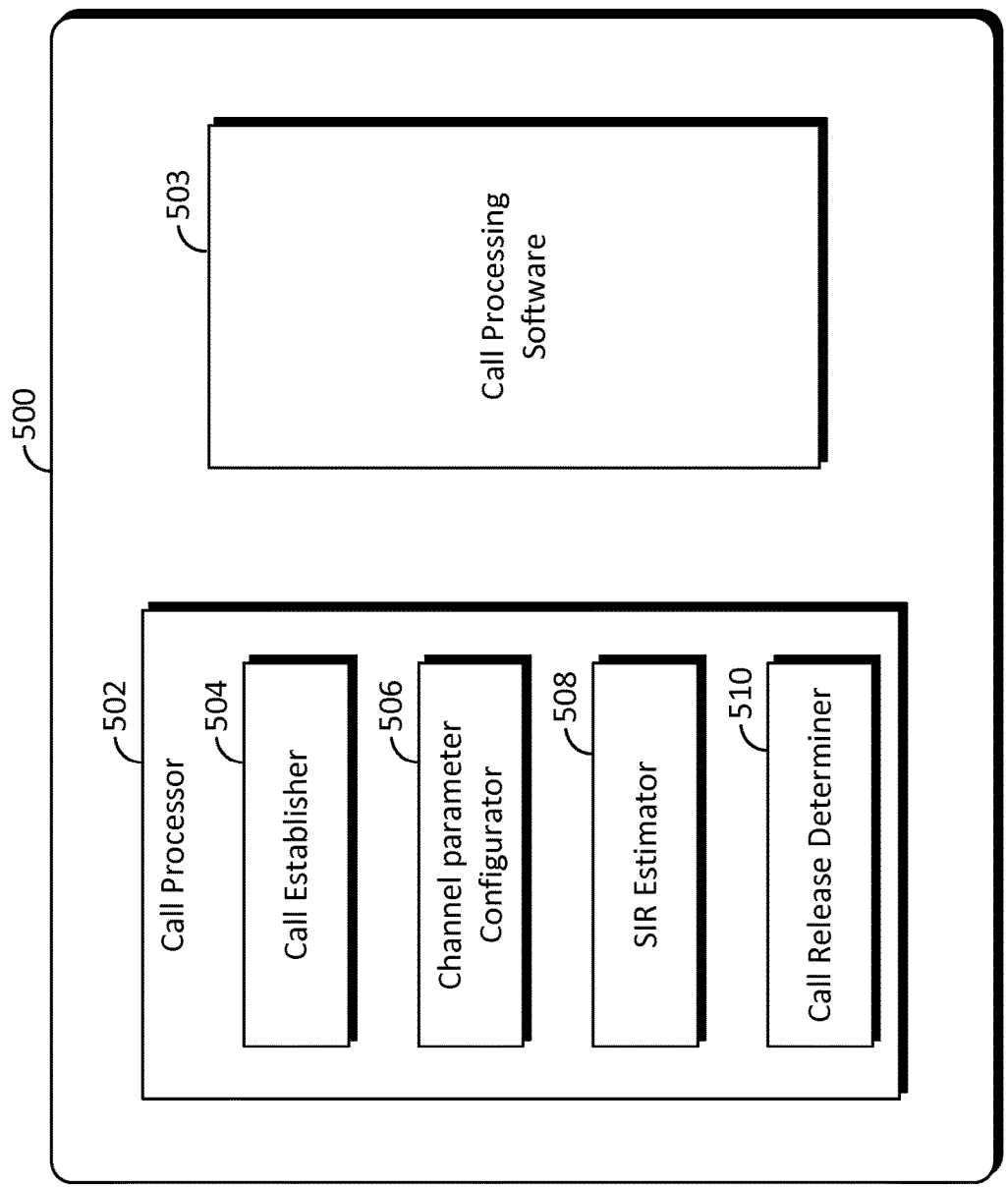
FIG. 5 is a conceptual block diagram of a user equipment (UE) configured to gracefully release R99 DPCH and F-DPCH calls in a W-CDMA network in accordance with an aspect of the disclosure.

FIG. 5 is a conceptual block diagram of a UE 500 configured to gracefully handle R99 DPCH and F-DPCH call releases in a W-CDMA network in accordance with an aspect of the disclosure. The UE 500 may be any of the UEs illustrated in FIGS. 1, 2, and 7. The UE 500 includes a call processor 502, which supports R99 DPCH and F-DPCH calls. The call processor 502 may be implemented using software, hardware, firmware, or a combination thereof. For example, in one aspect of the disclosure, software 503 for implementing the call processor 502 may be stored and executed by a hardware processor of the UE. The call processor 502 includes a call establisher 504, a channel parameter configurator 506, an SIR estimator 508, and a call release determiner 510. In one aspect of the disclosure, the call establisher 504 may implement procedures and functions for establishing an R99 DPCH call and/or F-DPCH call with a Node B. (e.g., see 3GPP TS 25.221 (Release 1999) for R99 DPCH call establishment and 3GPP TS 25.221 (Release 6) for F-DPCH call establishment.)

In one aspect of the disclosure, the channel parameter configurator 506 of the call processor 502 may configure various call parameters of R99 DPCH and F-DPCH calls or connections. In one example, the channel parameter configurator 506 may configure the $Q_{in}$ and $Q_{out}$ values of F-DPCH to be several decibels (dB) higher than the respective values for R99 DPCH. In one aspect of the disclosure, the channel parameter configurator 506 may set the $Q_{in}$ and $Q_{out}$ values of R99 DPCH to be −3 dB and −6.50 dB, respectively; and $Q_{in}$ and $Q_{out}$ values of F-DPCH to be −1 dB and −4.50 dB, respectively. These values are merely exemplary and may vary in different system implementations based on simulation, actual network measurements, or various system requirements.

In one aspect of the disclosure, the SIR estimator 508 may estimate the DL SIR of R99 DPCH and F-DPCH. For example, the SIRE of an R99 DPCH may be determined based on DL dedicated pilot symbols (e.g., pilot 302 of FIG. 3) received from a Node B. The SIRE of an F-DPCH may be determined based on DL TPC symbols (e.g., TPC 304 of FIG. 3) received from the Node B. In other aspects of the disclosure, different methods may be used to estimate the SIR for R99 DPCH and F-DPCH.

In another aspect of the disclosure, the call release determiner 510 of the call processor 502 may be configured to determine when to release R99 DPCH and/or F-DPCH calls. In one aspect of the disclosure, the call release determiner 510 may declare OOS and release an R99 DPCH or F-DPCH call when the SIRE determined by the SIR estimator 508 is below the respective R99 DPCH and F-DPCH $Q_{out}$ values set by the channel parameter configurator 506. In one aspect of the disclosure, the call release determiner 510 may release an R99 DPCH or F-DPCH call or a packet switched connection in the absence of an RRC Connection Release message from the Node B or base station within a predetermined time. In one example, the predetermined time may be about 15 seconds.

In another aspect of the disclosure, the call release determiner 510 of the call processor 502 may use a wrap up event (e.g., safety clause) as described above to release R99 DPCH and F-DPCH calls. For example, the call release determiner 510 may declare radio link failure and release call resources if the following two conditions are satisfied: (1) if the absolute DL SIRE is less than x dB (e.g., about 6 dB) (or, the SIRE lags (less than) SIRT target (SIRT) by a certain amount (e.g., y dB or greater, about 6 dB) for t amount of time (e.g., about 10 seconds), and (2) if UL TPC commands are such that a wind-up situation (i.e., UE sends all up TPC commands to the Node B) persists for the entire time duration t.

In yet another aspect of the disclosure, the call release determiner 510 of the call processor 502 may declare radio link failure and release R99 DPCH and F-DPCH calls if the TPC rejection values appear to be larger than z % and the SIRE lags the SIRT by a certain threshold (which can be determined based on simulation or actual network measurements), or, the SIRE falls below an absolute value of x dB) for t amount of time, as described above.

Figure 6:
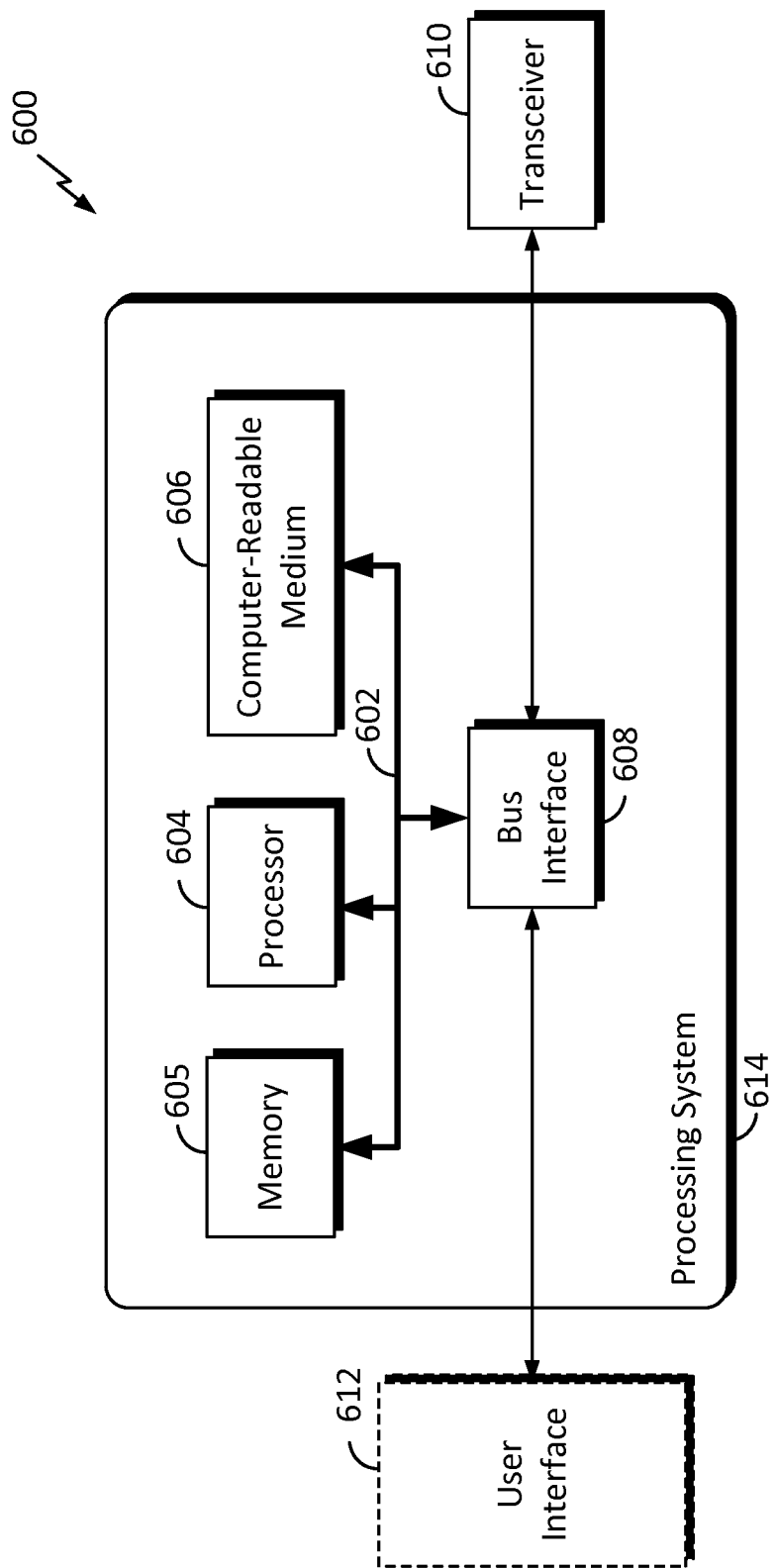
FIG. 6 is a block diagram illustrating an example of a hardware implementation for an apparatus employing a processing system in accordance with an aspect of the disclosure.

FIG. 6 is a conceptual diagram illustrating an example of a hardware implementation for an apparatus 600 employing a processing system 614. In accordance with various aspects of the disclosure, an element, or any portion of an element, or any combination of elements may be implemented with a processing system 614 that includes one or more processors 604. For example, the apparatus 600 may be a user equipment (UE) as illustrated in any one or more of FIGS. 1, 2, 5, and/or 7. In another example, the apparatus 600 may be a radio network controller (RNC) as illustrated in FIG. 1. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 604, as utilized in an apparatus 600, may be used to implement any one or more of the processes described below and illustrated in FIGS. 8-12.

In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick, touchscreen, touchpad) may also be provided.

In various aspects of the disclosure, the processor 604 may be used to implement the call processor 502 of FIG. 5, and the computer-readable medium 606 may be used to store call processing software (e.g., software 503) that when executed may configure the apparatus 600 to perform the various functions described throughout this disclosure as illustrated in FIGS. 8-12.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 7:
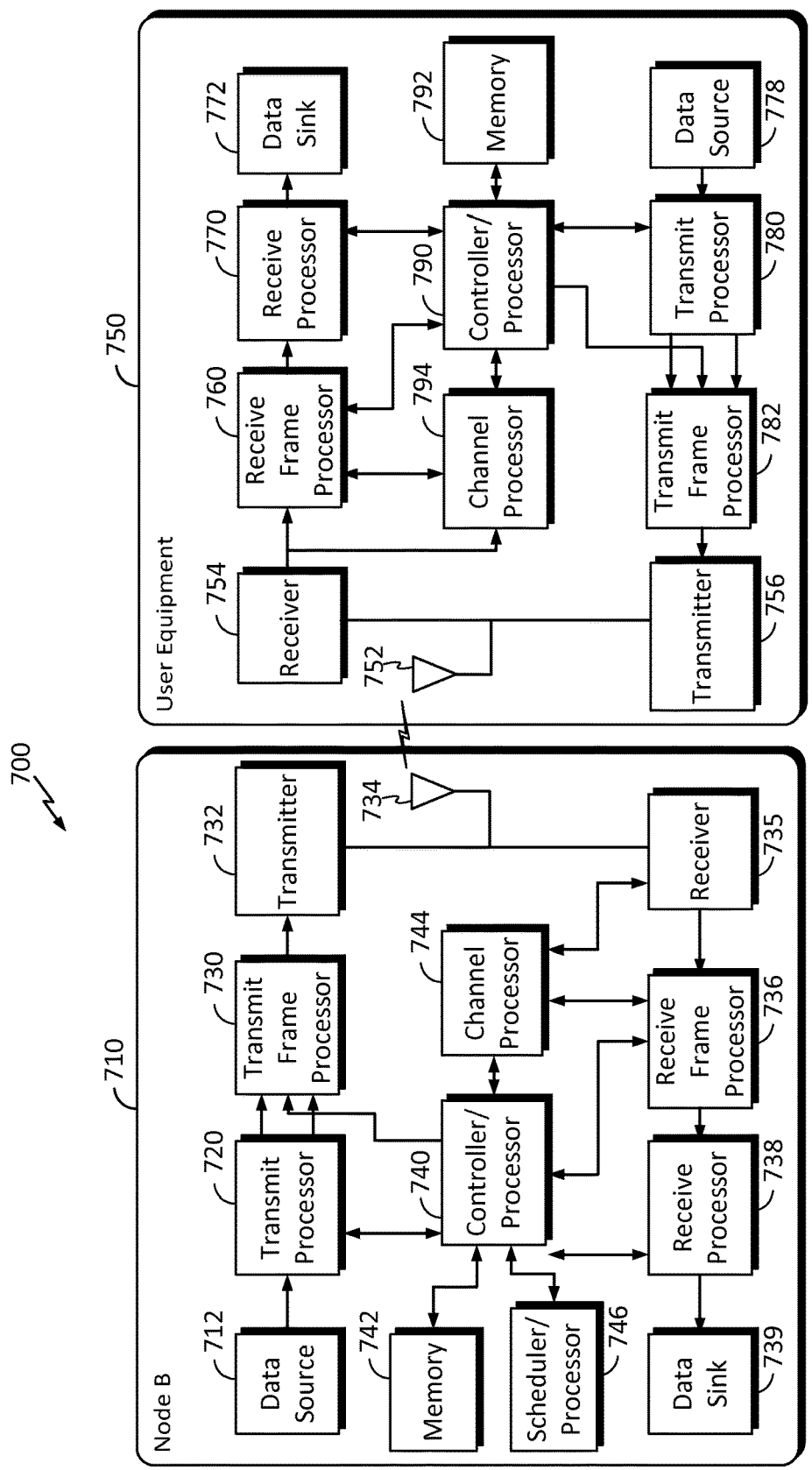
FIG. 7 is a block diagram conceptually illustrating an example of a Node B in communication with a UE in a telecommunications system.

FIG. 7 is a block diagram of an exemplary Node B 710 in communication with an exemplary UE 750, where the Node B 710 may be the Node B 108 in FIG. 1, and the UE 750 may be the UE 110 in FIG. 1. In other aspects of the disclosure, the UE 750 may be any of the UEs illustrated in FIGS. 1, 2, and 5. In the downlink communication, a transmit processor 720 may receive data from a data source 712 and control signals from a controller/processor 740. The transmit processor 720 provides various signal processing functions for the data and control signals, as well as reference signals (e.g., pilot signals). For example, the transmit processor 720 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 744 may be used by a controller/processor 740 to determine the coding, modulation, spreading, and/or scrambling schemes for the transmit processor 720. These channel estimates may be derived from a reference signal transmitted by the UE 750 or from feedback from the UE 750. The symbols generated by the transmit processor 720 are provided to a transmit frame processor 730 to create a frame structure. The transmit frame processor 730 creates this frame structure by multiplexing the symbols with information from the controller/processor 740, resulting in a series of frames. The frames are then provided to a transmitter 732, which provides various signal conditioning functions including amplifying, filtering, and modulating the frames onto a carrier for downlink transmission over the wireless medium through antenna 734. The antenna 734 may include one or more antennas, for example, including beam steering bidirectional adaptive antenna arrays or other similar beam technologies.

At the UE 750, a receiver 754 receives the downlink transmission through an antenna 752 and processes the transmission to recover the information modulated onto the carrier. The information recovered by the receiver 754 is provided to a receive frame processor 760, which parses each frame, and provides information from the frames to a channel processor 794 and the data, control, and reference signals to a receive processor 770. The receive processor 770 then performs the inverse of the processing performed by the transmit processor 720 in the Node B 710. More specifically, the receive processor 770 descrambles and despreads the symbols, and then determines the most likely signal constellation points transmitted by the Node B 710 based on the modulation scheme. These soft decisions may be based on channel estimates computed by the channel processor 794. The soft decisions are then decoded and deinterleaved to recover the data, control, and reference signals. The CRC codes are then checked to determine whether the frames were successfully decoded. The data carried by the successfully decoded frames will then be provided to a data sink 772, which represents applications running in the UE 750 and/or various user interfaces (e.g., display). Control signals carried by successfully decoded frames will be provided to a controller/processor 790. When frames are unsuccessfully decoded by the receiver processor 770, the controller/processor 790 may also use an acknowledgement (ACK) and/or negative acknowledgement (NACK) protocol to support retransmission requests for those frames.

In the uplink, data from a data source 778 and control signals from the controller/processor 790 are provided to a transmit processor 780. The data source 778 may represent applications running in the UE 750 and various user interfaces (e.g., keyboard). Similar to the functionality described in connection with the downlink transmission by the Node B 710, the transmit processor 780 provides various signal processing functions including CRC codes, coding and interleaving to facilitate FEC, mapping to signal constellations, spreading with OVSFs, and scrambling to produce a series of symbols. Channel estimates, derived by the channel processor 794 from a reference signal transmitted by the Node B 710 or from feedback contained in the midamble transmitted by the Node B 710, may be used to select the appropriate coding, modulation, spreading, and/or scrambling schemes. The symbols produced by the transmit processor 780 will be provided to a transmit frame processor 782 to create a frame structure. The transmit frame processor 782 creates this frame structure by multiplexing the symbols with information from the controller/processor 790, resulting in a series of frames. The frames are then provided to a transmitter 756, which provides various signal conditioning functions including amplification, filtering, and modulating the frames onto a carrier for uplink transmission over the wireless medium through the antenna 752.

The uplink transmission is processed at the Node B 710 in a manner similar to that described in connection with the receiver function at the UE 750. A receiver 735 receives the uplink transmission through the antenna 734 and processes the transmission to recover the information modulated onto the carrier. The information recovered by the receiver 735 is provided to a receive frame processor 736, which parses each frame, and provides information from the frames to the channel processor 744 and the data, control, and reference signals to a receive processor 738. The receive processor 738 performs the inverse of the processing performed by the transmit processor 780 in the UE 750. The data and control signals carried by the successfully decoded frames may then be provided to a data sink 739 and the controller/processor, respectively. If some of the frames were unsuccessfully decoded by the receive processor, the controller/processor 740 may also use an acknowledgement (ACK) and/or negative acknowledgement (NACK) protocol to support retransmission requests for those frames.

The controller/processors 740 and 790 may be used to direct the operation at the Node B 710 and the UE 750, respectively. For example, the controller/processors 740 and 790 may provide various functions including timing, peripheral interfaces, voltage regulation, power management, and other control functions. The computer readable media of memories 742 and 792 may store data and software for the Node B 710 and the UE 750, respectively. A scheduler/processor 746 at the Node B 710 may be used to allocate resources to the UEs and schedule downlink and/or uplink transmissions for the UEs.

Figure 8:
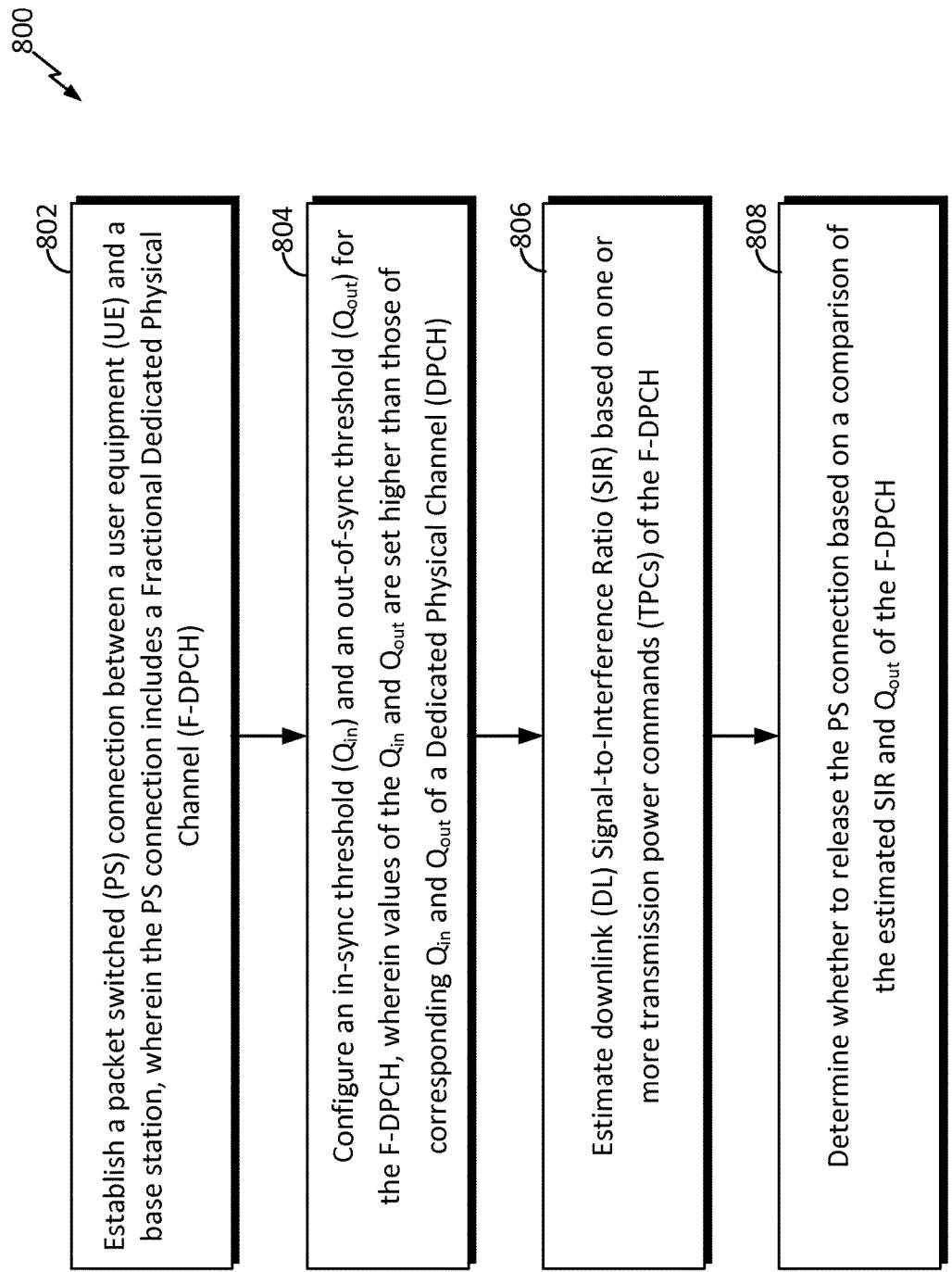
FIG. 8 is a flowchart illustrating a procedure for gracefully releasing R99 DPCH and F-DPCH calls at a UE in a W-CDMA network in accordance with an aspect of the disclosure.

FIG. 8 is a flowchart illustrating a procedure 800 for gracefully handling R99 DPCH and F-DPCH call release at a UE in a W-CDMA network in accordance with an aspect of the disclosure. In various aspects of the disclosure, the procedure 800 may be performed by any of the UEs illustrated in FIGS. 1, 2, 5, and 7, which may be implemented using the apparatus 600 for example. At block 802, a UE establishes a packet switched (PS) connection or call between the UE and a base station wherein the PS connection includes an F-DPCH. For example, the PS connection may be an F-DPCH call established between a UE 110 and a Node B 108. At block 804, the UE configures an in-sync threshold ($Q_{in}$) and an out-of-sync threshold ($Q_{out}$) for the F-DPCH. The values of the $Q_{in}$ and $Q_{out}$ of F-DPCH are set higher than those of corresponding $Q_{in}$ and $Q_{out}$ of DPCH. In one example, the $Q_{in}$ and $Q_{out}$ of F-DPCH may be set to −3 dB and −6.50 dB respectively. At block 806, the UE estimates DL SIR based on one or more TPC commands of the F-DPCH. At block 808, the UE determines whether to release the PS connection or call based on a comparison of the estimated SIR and $Q_{out}$ of the F-DPCH. For example, the UE may determine OOS and radio link failure based on the estimated SIR and $Q_{out}$ as described above to decide when to release the PS connection or call.

Figure 9:
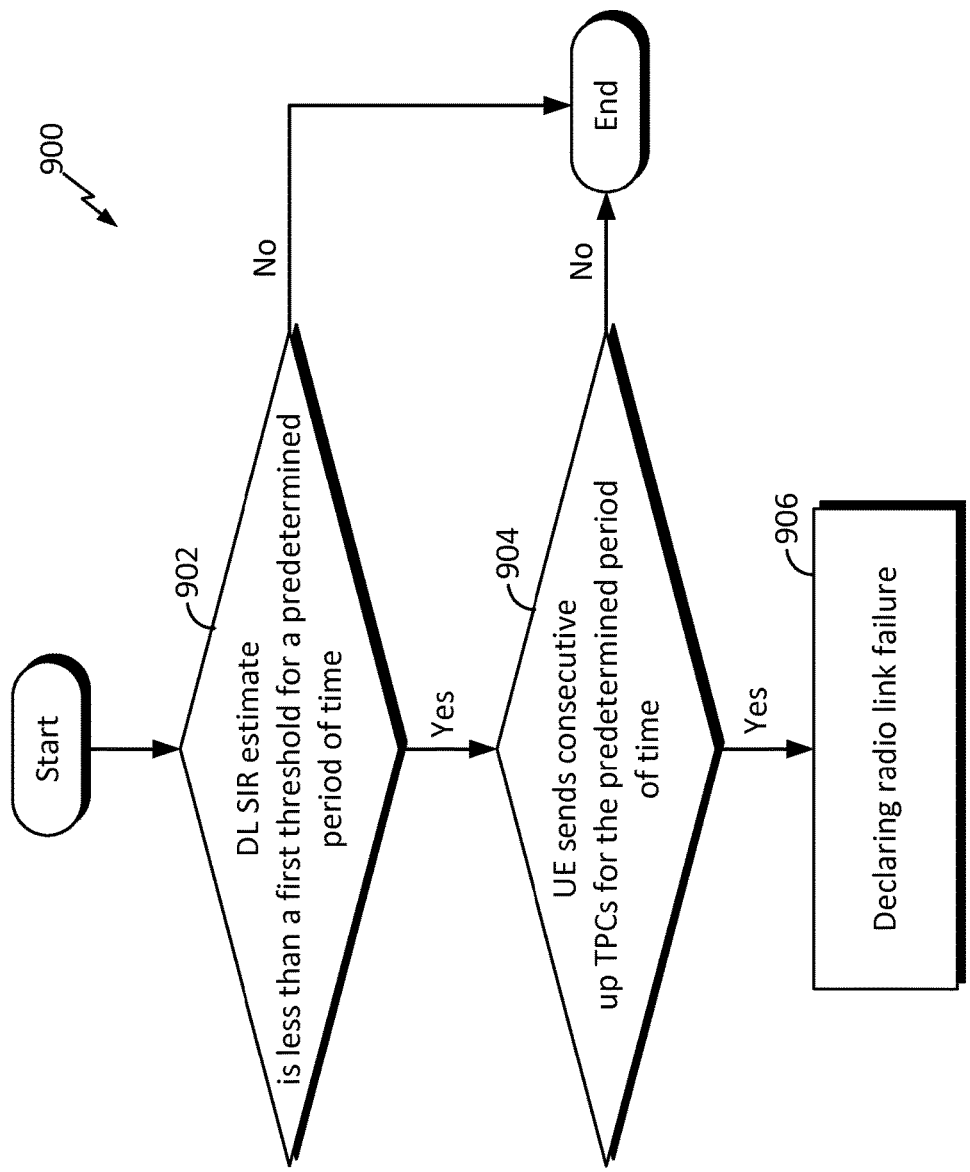
FIG. 9 is a flowchart illustrating a procedure for declaring radio link failure at a UE in a W-CDMA network in accordance with an aspect of the disclosure.

FIG. 9 is a flowchart illustrating a procedure 900 for declaring radio link failure at a UE in a W-CDMA network in accordance with an aspect of the disclosure. In various aspects of the disclosure, the procedure 900 may be performed by any of the UEs illustrated in FIGS. 1, 2, 5, and 7, which may be implemented using the apparatus 600 for example. At block 902, if it is determined that DL SIRE is less than a first threshold for a predetermined period of time, the procedure continues to block 904; otherwise, the procedure ends. For example, the first threshold may be x dB (e.g., 6 dB), and the period of time may be t seconds (e.g., about 10 seconds). At block 904, if it is determined that the UE sends consecutive up TPC commands (wind-up) for the predetermined period of time, the procedure continues to block 906; otherwise, the procedure ends. At block 906, the UE declares radio link failure.

Figure 10:
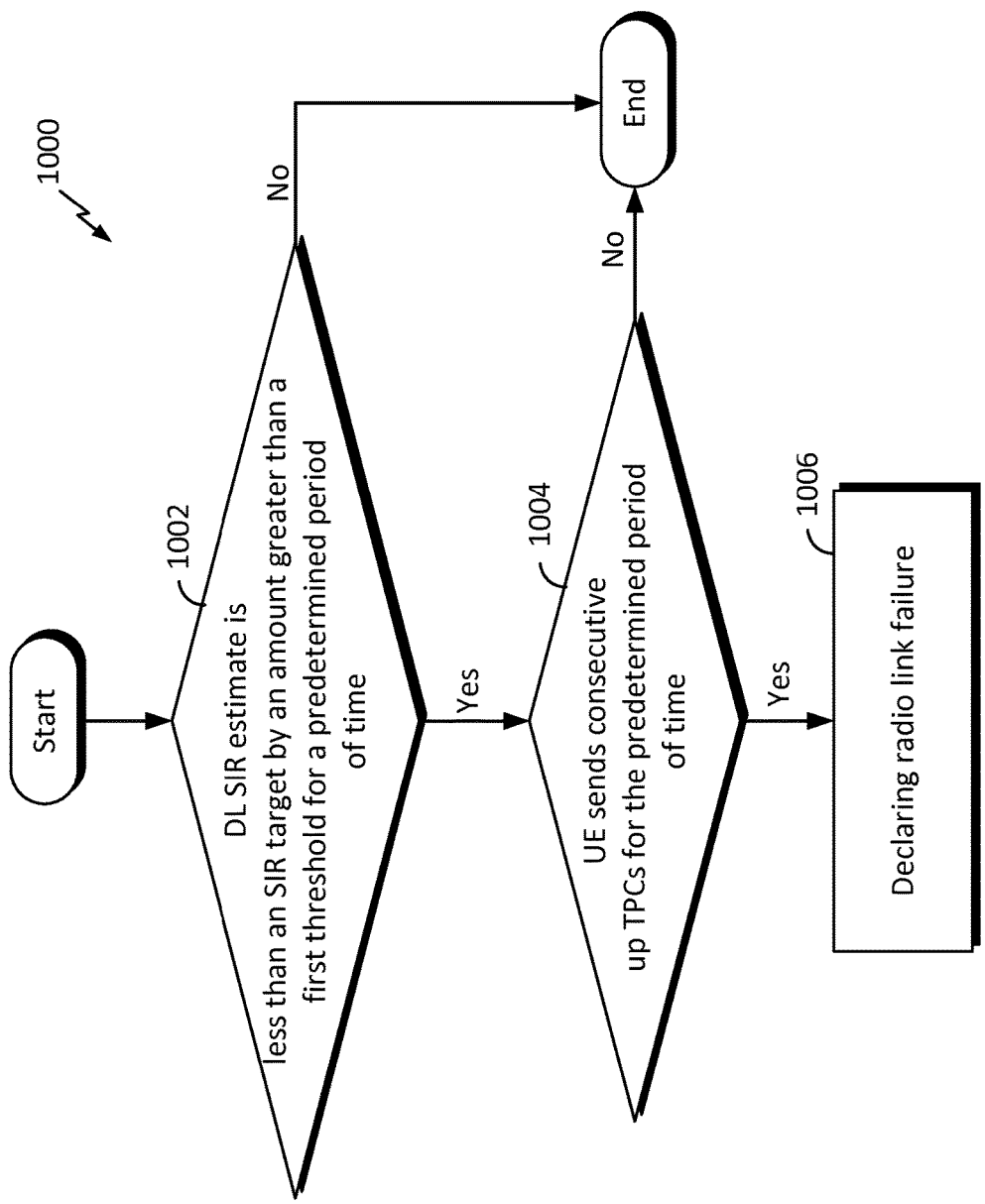
FIG. 10 is a flowchart illustrating a procedure for declaring radio link failure at a UE in a W-CDMA network in accordance with another aspect of the disclosure.

FIG. 10 is a flowchart illustrating a procedure 1000 for declaring radio link failure at a UE in a W-CDMA network in accordance with an aspect of the disclosure. In various aspects of the disclosure, the procedure 1000 may be performed by any of the UEs illustrated in FIGS. 1, 2, 5, and 7, which may be implemented using the apparatus 600 for example. At block 1002, if it is determined that DL SIRE is less than an SIRT by an amount greater than a first threshold for a predetermined period of time, the procedure 1000 continues to block 1004; otherwise, the procedure 1000 ends. For example, the first threshold may be x dB (e.g., 6 dB), and the period of time may be t seconds (e.g., about 10 seconds). At block 1004, if it is determined that the UE sends consecutive up TPC commands (wind-up) for the predetermined period of time, the procedure continues to block 1006; otherwise, the procedure ends. At block 1006, the UE declares radio link failure.

Figure 11:
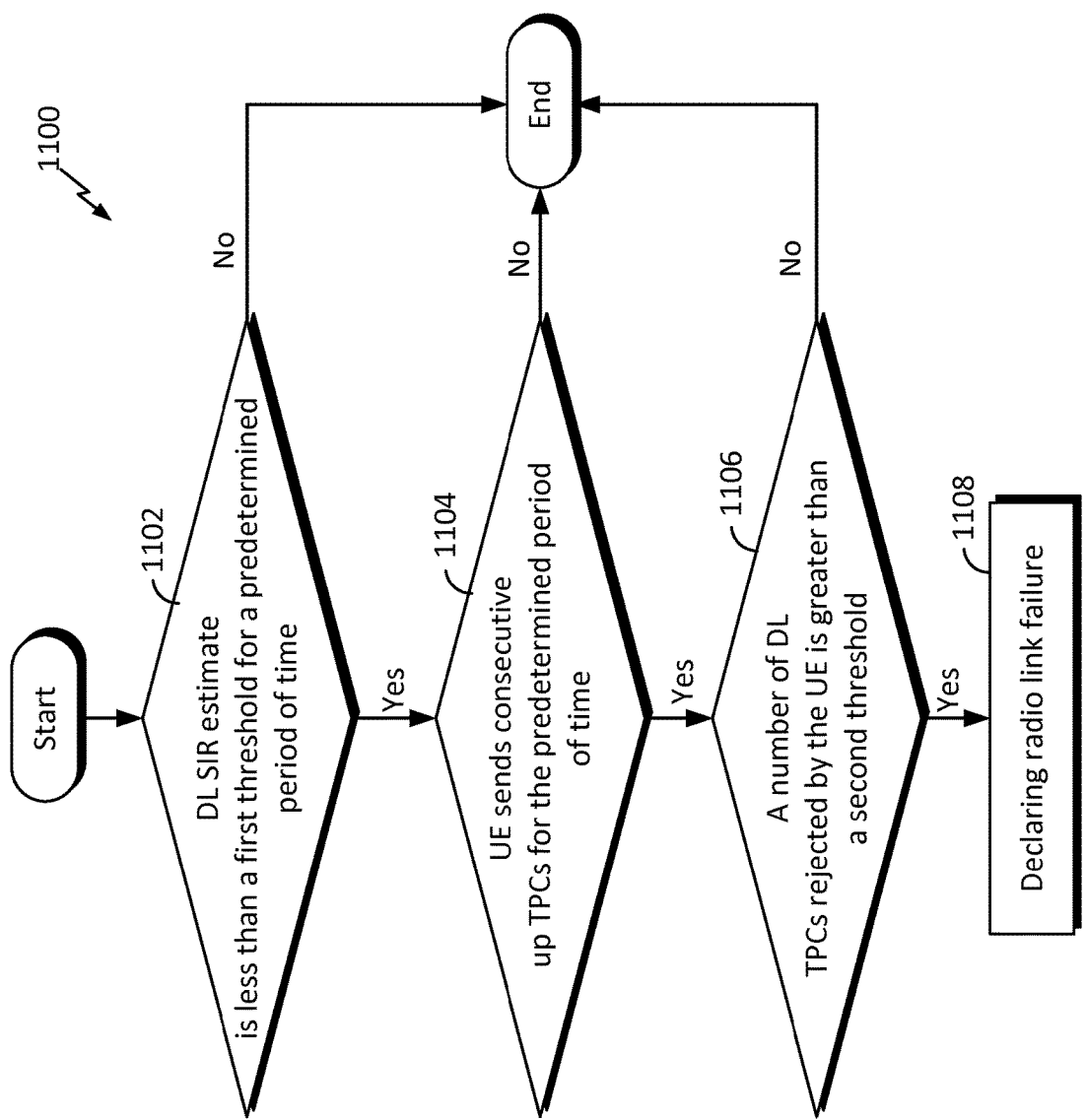
FIG. 11 is a flowchart illustrating a procedure for declaring radio link failure at a UE in a W-CDMA network in accordance with another aspect of the disclosure.

FIG. 11 is a flowchart illustrating a procedure 1100 for declaring radio link failure at a UE in a W-CDMA network in accordance with an aspect of the disclosure. In various aspects of the disclosure, the procedure 1100 may be performed by any of the UEs illustrated in FIGS. 1, 2, 5, and 7, which may be implemented using the apparatus 600 for example. At block 1102, if it is determined that DL SIRE is less than a first threshold for a predetermined period of time, the procedure continues to block 1104; otherwise, the procedure ends. For example, the first threshold may be x dB (e.g., about 6 dB), and the period of time is t seconds (e.g., about 10 seconds). At block 1104, if it is determined that the UE sends consecutive up TPC commands (wind-up) for the predetermined period of time, the procedure continues to block 1106; otherwise, the procedure ends. At block 1106, if it is determined that a number of DL TPC commands rejected by the UE is greater than a second threshold, the procedure continues to block 1108; otherwise, the procedure ends. For example, the second threshold may be z % (e.g., about 90%). At block 1108, the UE declares radio link failure.

Figure 12:
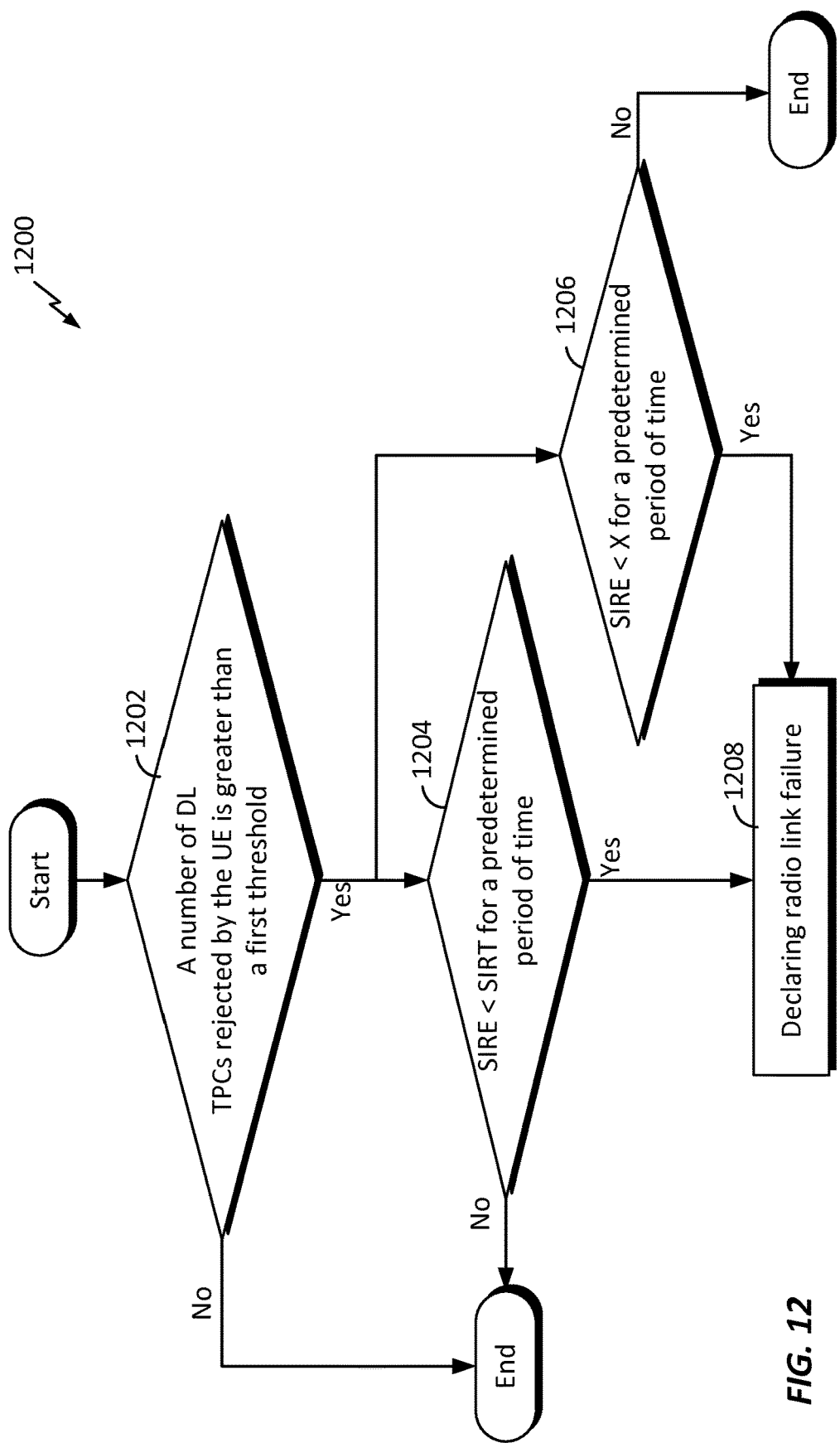
FIG. 12 is a flowchart illustrating a procedure for declaring radio link failure at a UE in a W-CDMA network in accordance with another aspect of the disclosure.

FIG. 12 is a flowchart illustrating a procedure 1200 for declaring radio link failure at a UE in a W-CDMA network in accordance with an aspect of the disclosure. In various aspects of the disclosure, the procedure 1200 may be performed by any of the UEs illustrated in FIGS. 1, 2, 5, and 7, which may be implemented using the apparatus 600, for example. At block 1202, if it is determined that a number of DL TPC commands rejected by the UE is greater than a first threshold, the procedure continues to blocks 1204 and/or 1206; otherwise, the procedure ends. The first threshold may be z % (e.g., about 90%). At block 1204, if it is determined that SIRE is less than SIRT by a second threshold for a predetermined period of time, the procedure continues to block 1208; otherwise, the procedure ends. For example, the second threshold may be x dB (e.g., 6 dB), and the predetermined period of time may be t seconds (e.g., about 10 seconds). At block 1206, if it is determined that SIRE is less than a third threshold for the predetermined period of time, the procedure continues to block 1208. For example, the third threshold may be y dB (e.g., about 6 dB). At block 1208, the UE declares radio link failure.

In various aspects of the disclosure, the methods and procedures illustrated in FIGS. 8-12 may be performed in various orders different from those illustrated in the figures. In some aspects of the disclosure, some or all of the steps illustrated in FIGS. 8-12 may be performed to handle DPCH and F-DPCH calls at any of the UEs illustrated in FIGS. 1, 2, 5, and/or 7.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The invention claimed is:

1. A method for wireless communication operable at a user equipment (UE), comprising:
    establishing a packet switched (PS) connection between the UE and a base station,
    wherein the PS connection comprises a downlink (DL) Fractional Dedicated Physical Channel (F-DPCH);
    configuring a first in-sync threshold (Qin,) and a first out-of-sync threshold (Qout,) for the DL F-DPCH;
    configuring a second Qin and a second Qout for a DL Dedicated Physical Channel (DPCH) such that the first Qin is higher than the second Qin and the first Qout is higher than the second Qout;
    estimating a DL Signal to Interference Ratio (SIR) based on one or more transmit power control (TPC) commands of the DL F-DPCH; and
    releasing the PS connection based on a comparison of the estimated SIR and the first Qout of the DL F-DPCH.

2. The method of claim 1, wherein determining whether to release the PS connection comprises:
    determining whether to release the PS connection in the absence of a Radio Resource Control (RRC) Connection Release message from the base station within a predetermined time.

3. The method of claim 1, further comprising declaring radio link failure, in response to determining that:
    the DL SIR estimate is less than a first threshold for a predetermined period of time, and
    the UE sends consecutive up TPCs for the predetermined period of time.

4. The method of claim 1, further comprising declaring radio link failure, in response to determining that:
    the DL SIR estimate is less than a SIR target by an amount greater than a first threshold for a predetermined period of time, and
    the UE sends consecutive up TPC commands for the predetermined period of time.

5. The method of claim 1, further comprising declaring radio link failure, in response to determining that:
    the DL SIR estimate is less than a first threshold for a predetermined period of time,
    the UE sends consecutive up TPC commands for the predetermined period of time, and
    a number of DL TPC commands rejected by the UE is greater than a second threshold.

6. The method of claim 1, further comprising declaring radio link failure, in response to determining that:
  a number of DL TPC commands rejected by the UE is greater than a first threshold, and
  the DL SIR estimate is less than a second threshold for a predetermined period of time, or less than a SIR target by an amount greater than a third threshold for the predetermined period of time.

7. An apparatus for wireless communication, comprising:
  means for establishing a packet switched (PS) connection between the apparatus and a base station, wherein the PS connection comprises a downlink (DL) Fractional Dedicated Physical Channel (F-DPCH);
  means for configuring a first in-sync threshold (Qin) and a first out-of-sync threshold ($Qo_{ot}$) for the DL F-DPCH;
  means for configuring a second Qin and a second Qout for a DL Dedicated Physical Channel (DPCH) such that the first Qin is higher than the second Qin and the first Qout is higher than the second Qout;
  means for estimating a DL Signal-to-Interference Ratio (SIR) based on one or more transmit power control (TPC) commands of the DL F-DPCH; and
  means for releasing the PS connection based on a comparison of the estimated SIR and the first Qout of the DL F-DPCH.

8. The apparatus of claim 7, wherein the means for determining whether to release the PS connection is configured to determine whether to release the PS connection in the absence of a Radio Resource Control (RRC) Connection Release message from the base station within a predetermined time.

9. The apparatus of claim 7, wherein the means for determining whether to release the PS connection is configured to declare radio link failure, in response to determining that:
  the DL SIR estimate is less than a first threshold for a predetermined period of time, and
  the apparatus sends consecutive up TPCs for the predetermined period of time.

10. The apparatus of claim 7, wherein the means for determining whether to release the PS connection is configured to declare radio link failure, in response to determining that:
  the DL SIR estimate is less than a SIR target by an amount greater than a first threshold for a predetermined period of time, and
  the apparatus sends consecutive up TPCs for the predetermined period of time.

11. The apparatus of claim 7,
  wherein the means for determining whether to release the PS connection is configured to declare radio link failure, in response to determining that:
  the DL SIR estimate is less than a first threshold for a predetermined period of time,
  the apparatus sends consecutive up TPCs for the predetermined period of time, and
  a number of DL TPCs rejected by the apparatus is greater than a second threshold.

12. The apparatus of claim 7,
  wherein the means for determining whether to release the PS connection is configured to declare radio link failure, in response to determining that:
  a number of DL TPCs rejected by the apparatus is greater than a first threshold, and
  the DL SIR estimate is less than a second threshold for a predetermined period of time, or less than an SIR target by an amount greater than a third threshold for the predetermined period of time.

13. A non-transitory computer-readable storage medium comprising code for causing a user equipment (UE) to:
  establish a packet switched (PS) connection between the UE and a base station, wherein the PS connection comprises a downlink (DL) Fractional Dedicated Physical Channel (F-DPCH) and a DL Dedicated Physical Channel (DPCH);
  configure a first in-sync threshold (Qin) and a first out-of-sync threshold (Qout) for the DL F-DPCH;
  configure a second Qin and a second Qout for a DL Dedicated Physical Channel (DPCH) such that the first Qin, is higher than the second Qin and the first Qout is higher than the second Qout;
  estimate a DL Signal-to-Interference Ratio (SIR) based on one or more transmit power control (TPC) commands of the DL F-DPCH; and
  releasing the PS connection based on a comparison of the estimated SIR and the first Qout of the DL F-DPCH.

14. The non-transitory computer-readable storage medium of claim 13, wherein the code further causes the UE to:
  determine whether to release the PS connection in the absence of a Radio Resource Control (RRC) Connection Release message from the base station within a predetermined time.

15. The non-transitory computer-readable storage medium of claim 13, wherein the code further causes the UE to declare radio link failure, in response to determining that:
  the DL SIR estimate is less than a first threshold for a predetermined period of time, and
  the UE sends consecutive up TPCs for the predetermined period of time.

16. The non-transitory computer-readable storage medium of claim 13, wherein the code further causes the UE to declare radio link failure, in response to determining that:
  the DL SIR estimate is less than a SIR target by an amount greater than a first threshold fora predetermined period of time, and
  the UE sends consecutive up TPCs for the predetermined period of time.

17. The non-transitory computer-readable storage medium of claim 13, wherein the code further causes the UE to declare radio link failure, in response to determining that:
  the DL SIR estimate is less than a first threshold for a predetermined period of time,
  the UE sends consecutive up TPCs for the predetermined period of time, and
  a number of DL TPCs rejected by the UE is greater than a second threshold.

18. The non-transitory computer-readable storage medium of claim 13, wherein the code further causes the UE to declare radio link failure, in response to determining that:
  a number of DL TPCs rejected by the UE is greater than a first threshold, and
  the DL SIR estimate is less than a second threshold for a predetermined period of time, or less than an SIR target by an amount greater than a third threshold for the predetermined period of time.

\* \* \* \* \*